(12) United States Patent
Zhu

(10) Patent No.: US 12,414,080 B2
(45) Date of Patent: Sep. 9, 2025

(54) PAGING METHODS, TERMINAL AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 398 days.

(21) Appl. No.: 18/009,694

(22) PCT Filed: Aug. 4, 2020

(86) PCT No.: PCT/CN2020/106779
§ 371 (c)(1),
(2) Date: Dec. 9, 2022

(87) PCT Pub. No.: WO2022/027221
PCT Pub. Date: Feb. 10, 2022

(65) Prior Publication Data
US 2023/0224860 A1    Jul. 13, 2023

(51) Int. Cl.
*H04W 68/02*    (2009.01)
(52) U.S. Cl.
CPC ................... *H04W 68/02* (2013.01)
(58) Field of Classification Search
CPC .................................... H04W 68/02
USPC ........................................ 455/458
See application file for complete search history.

(56) References Cited

U.S. PATENT DOCUMENTS

| 9,681,417 | B2 | 6/2017 | Hu et al. | |
|---|---|---|---|---|
| 9,913,250 | B2 | 3/2018 | Hu et al. | |
| 10,299,247 | B2 | 5/2019 | Hu et al. | |
| 10,531,428 | B2 | 1/2020 | Hu et al. | |
| 2012/0281553 | A1 | 11/2012 | Mujtaba et al. | |
| 2015/0195818 | A1* | 7/2015 | Davydov | H04W 72/23 370/329 |
| 2016/0205659 | A1 | 7/2016 | Bergman et al. | |
| 2016/0302150 | A1* | 10/2016 | Palenius | H04W 52/0274 |
| 2017/0019878 | A1 | 1/2017 | Hu et al. | |
| 2017/0257845 | A1 | 9/2017 | Hu et al. | |
| 2018/0152913 | A1 | 5/2018 | Hu et al. | |

(Continued)

FOREIGN PATENT DOCUMENTS

| CN | 102209389 A | 10/2011 |
|---|---|---|
| CN | 103428812 A | 12/2013 |

(Continued)

OTHER PUBLICATIONS

Extended European Search Report of EP Application No. 20948084.7 dated Jul. 10, 2023, (11p).

(Continued)

*Primary Examiner* — Joel Ajayi
(74) *Attorney, Agent, or Firm* — Arch & Lake LLP; Hao Tan; Shen Wang

(57) ABSTRACT

A paging method performed by a network device is provided. The method comprises: sending at least one of a first paging channel or a second paging channel to terminals belonging to a same terminal group, first paging being used for paging corresponding to signal quality being greater than a target signal threshold, and second paging being used for paging corresponding to the signal quality being less than or equal to the target signal threshold.

15 Claims, 7 Drawing Sheets

(56) References Cited

U.S. PATENT DOCUMENTS

2019/0254002 A1    8/2019   Hu et al.
2020/0120637 A1    4/2020   Hu et al.

FOREIGN PATENT DOCUMENTS

| CN | 105491663 A | 4/2016 |
| CN | 110677908 A | 1/2020 |
| CN | 111315012 A | 6/2020 |
| WO | 2009063422 A1 | 5/2009 |

OTHER PUBLICATIONS

Qualcomm Incorporated, "Paging design consideration" 3GPP TSG-RAN WG1 #88bis, R1-1705570, Spokane, USA, Apr. 2017, (8p).
Dahlman, Erik, et al., "4G LTE/LTE-Advanced for Mobile Broadband" (24p).
International Search Report of PCT/CN2020/106779 dated Apr. 29, 2021, (4p).
Third Office Action of Chinese Application No. 202080001746.8 dated Feb. 28, 2025 with English translation, (15p).

\* cited by examiner

PAGING METHODS, TERMINAL AND STORAGE MEDIUM

CROSS-REFERENCE TO RELATED APPLICATION

This application is the U.S. national application of International Application No. PCT/CN2020/106779, filed on Aug. 4, 2020, the entire disclosure of which is incorporated herein by reference for all purposes.

TECHNICAL FIELD

The disclosure relates to a field of communication, in particular to a paging method, a paging apparatus, and a storage medium.

BACKGROUND

In the research of wireless communication technology, satellite communication is considered to be an important aspect in the future development of wireless communication technology. The satellite communication refers to communication carried out by a radio communication device on the ground using satellites as relays. A satellite communication system consists of a satellite part and a ground part. The characteristics of satellite communication are: a communication range is large; communication may be carried out from any two points as long as being within a range covered by radio waves emitted by the satellites; it is not easily affected by land disasters, that is, it has high reliability.

It is foreseeable that in the future wireless communication system, deep integration between the satellite communication system and a cellular communication system on land will be gradually realized, and intelligent connection of all things will be truly realized.

SUMMARY

According to a first aspect of the disclosure, a paging method is performed by a network device. The method includes:
  sending at least one of a first paging channel or a second paging channel to terminals belonging to a same terminal group, in which the first paging is configured for paging corresponding to a signal quality being greater than a target signal threshold, and the second paging is configured for paging corresponding to the signal quality being less than or equal to the target signal threshold.

According to a second aspect of the disclosure, a paging method is performed by a terminal. The method includes:
  in response to determining that a second paging needs to be received, detecting a second paging channel sent by a network device; and
  in response to determining that the detected second paging channel is configured for paging a terminal group where the terminal is located, prompting that a location of the terminal needs to be adjusted.

According to a third aspect of the disclosure, a terminal includes:
  a processor; and
  a memory for storing instructions executable by the processor;

The processor is configured to in response to determining that a second paging needs to be received, detect a second paging channel sent by a network device, in which the second paging is configured for paging corresponding to a signal quality being less than or equal to a target signal threshold; and in response to determining that the detected second paging channel is configured for paging a terminal group where the terminal is located, prompting that a location of the terminal needs to be adjusted.

It should be understood that the above general description and the following detailed description are exemplary and explanatory only, which are not restrictive of the disclosure.

BRIEF DESCRIPTION OF THE DRAWINGS

The accompanying drawings, which are incorporated in and constitute a part of this specification, illustrate embodiments consistent with the invention and together with the description serve to explain the principles of the invention.

DETAILED DESCRIPTION

Figure 1:
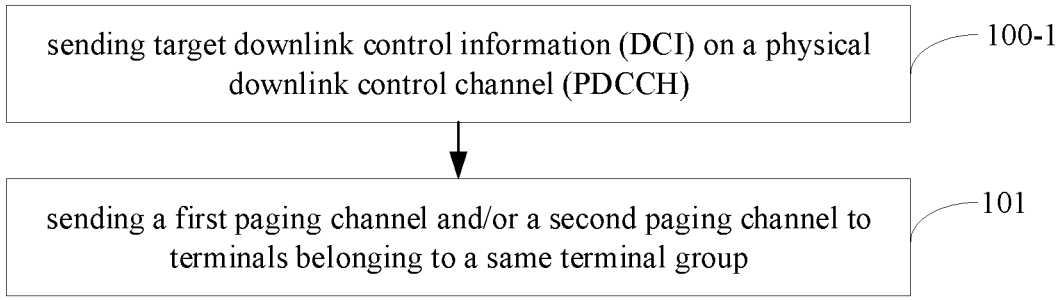
FIG. 1 is a schematic flowchart of a paging method according to an embodiment.

Reference will now be made in detail to the embodiments, examples of which are illustrated in the accompanying drawings. When the following description refers to the accompanying drawings, the same numerals in different drawings refer to the same or similar elements unless otherwise indicated. The implementations described in the following examples do not represent all implementations consistent with the present invention. Rather, they are merely examples of apparatuses and methods consistent with aspects of the invention as recited in the appended claims.

The terminology used in the disclosure is only for the purpose of describing particular embodiments, and is not intended to limit the disclosure. As used in the disclosure and the appended claims, the singular forms "a/an", "said", and "the" are intended to include the plural forms as well, unless the context clearly dictates otherwise. It should also be understood that the term "and/or" as used herein refers to and includes any and all possible combinations of one or more of the associated listed items.

It should be understood that, although the terms first, second, third, etc. may be used in the disclosure to describe various information, the information should not be limited to these terms. These terms are only used to distinguish information of the same type from one another. For example, without departing from the scope of the disclosure, first information may also be called second information, and similarly, the second information may also be called the first information. Depending on the context, the word "if" as used herein may be interpreted as "upon" or "when" or "in response to determining . . . "

The satellite communication has the advantage of wide coverage, but there are also a large number of areas where the satellite signal coverage is poor, such as indoors and areas with shelter. In the areas with poor satellite signal coverage, the terminal cannot receive normal paging information, and thus cannot perform normal communication.

The disclosure provides a paging solution, which may prompt that the location of the terminal needs to be adjusted through the second paging in the areas where the signal coverage of the network device is poor, so that the user may move to an area with good signal quality and the first paging can be performed. The first paging is configured for paging corresponding to the signal quality being greater than the target signal threshold, and the second paging is configured for paging corresponding to the signal quality being less than or equal to the target signal threshold.

In the embodiments of the disclosure, the network device includes but is not limited to a satellite and/or a base station, and the paging solution according to the disclosure may be used in the areas where satellite signals and/or base station signals have poor coverage.

The paging method according to the disclosure may be first introduced from the network device side as follows.

The embodiment of the disclosure provides a paging method that may be used in a network device. The network device includes but not limited to a satellite and a base station. The method may include the following step at 101.

At 101, a first paging channel and/or a second paging channel is sent to terminals belonging to a same terminal group.

In the embodiment of the disclosure, after receiving a paging message, the network device may periodically send the first paging channel and/or the second paging channel to the terminals belonging to the same terminal group. A sending period of the first paging channel may be the same as or different from that of the second paging channel, which is not limited in the disclosure.

In the embodiment of the disclosure, the first paging is configured for paging corresponding to a signal quality being greater than a target signal threshold, and the second paging is configured for paging corresponding to the signal quality being less than or equal to the target signal threshold.

In an example, the first paging is a normal paging initiated by the current network device to the terminal, and the second paging is a deep paging, which is an enhancement to the normal paging. The second paging may be used in the areas where the signal coverage conditions of the network device are poor.

In the above embodiment, in the areas where the signal coverage of the network device is poor, the user is enabled to adjust the location of the terminal by prompting that the location of the terminal needs to be adjusted, so that the user may normally receive the first paging channel in the future, thus achieving the purpose of paging in the areas where the signal coverage of the network device is poor.

In an embodiment, the network device may use any one of the following ways to notify the terminal that there is a second paging, so that the terminal detects the second paging channel.

In the first way, target downlink control information (DCI) is sent to the terminal on a physical downlink control channel (PDCCH).

Referring to FIG. 1, it is a flowchart of a paging method according to an embodiment. The method may further include the step at 100-1.

At 100-1, target DCI is sent on a PDCCH.

In the embodiment of the disclosure, the network device may send the target DCI on the PDCCH. The target DCI is DCI scrambled by a target radio network temporary identity (RNTI), and the target RNTI is RNTI corresponding to the second paging. The network device may indicate in the target DCI a first terminal group that needs to be paged.

In an example, the target DCI is DCI with cyclic redundancy check (CRC) scrambled by the target RNTI, and the target RNTI is a deep paging RNTI set for the second paging, such as Deep-P-RNTI.

In the second way, a preset sequence is sent to the terminal.

Figure 2:
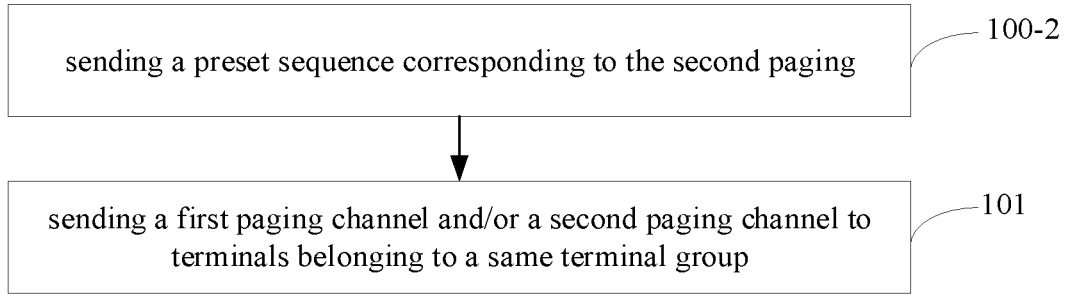
FIG. 2 is a schematic flowchart of another paging method according to an embodiment.

In an embodiment, referring to FIG. 2, it is a flowchart of a paging method according to an embodiment. The method may further include the step at 100-2.

At 100-2, a preset sequence corresponding to the second paging is sent.

In an example, the preset sequence may be a ZC (Zadoff-Chu) sequence. The sequence may be divided into two types, in which the first type is generated by a cyclic shift of a basic sequence; the second type is obtained by at least one Fourier transform using the ZC sequence. The ZC sequence has very good autocorrelation and very low cross-correlation, which can be used to generate synchronization signals as a correlated convey to time and frequency.

When the network device sends the preset sequence to the terminal, the network device may use at least one index corresponding to the preset sequence to indicate a second terminal group to be paged. The at least one index corresponding to the preset sequence may include a root index and/or a cycle index. The root index is a basic index of the ZC sequence, which corresponds to an original ZC sequence, and the cycle index is an index corresponding to a sequence obtained by the cyclic shift of the original ZC sequence.

In the above embodiments, the network device may send the target DCI through the PDCCH, or send the preset sequence to indicate the terminal that there is a second paging, so that the terminal detects the second paging channel. The purpose of paging is achieved in the areas where the signal coverage of the network device is poor.

Figure 3:
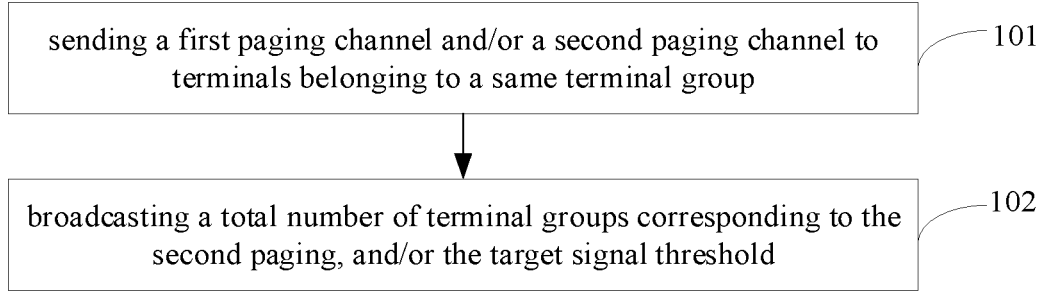
FIG. 3 is a schematic flowchart of another paging method according to an embodiment.

In an embodiment, referring to FIG. 3, it is a flowchart of a paging method according to an embodiment. The method may further include the step at 102.

At 102, a total number of terminal groups corresponding to the second paging, and/or the target signal threshold are broadcast.

In the embodiment of the disclosure, the network device may determine the total number of terminal groups corresponding to the second paging, assuming that the total number is M, and send the total number through a broadcast signaling. The terminal may determine a terminal group where it is located based on M and its own terminal identity after receiving the total number.

In addition, the network device may also send the target signal threshold by using a broadcast signaling, so that after the terminal receives the target signal threshold, the terminal may determine whether to receive the first paging or the second paging based on the measured signal quality.

In the above embodiment, the network device may broadcast the total number of terminal groups corresponding to the second paging, and/or the target signal threshold. The terminal determines the terminal group to which it belongs based on the total number of terminal groups corresponding to the second paging and its own terminal identity. In addition, the terminal may also determine whether the second paging needs to be received based on the target signal threshold and the currently measured signal quality. The implementation is simple and the availability is high.

Next, the paging method according to the disclosure may be introduced from the terminal side as follows.

Figure 4:
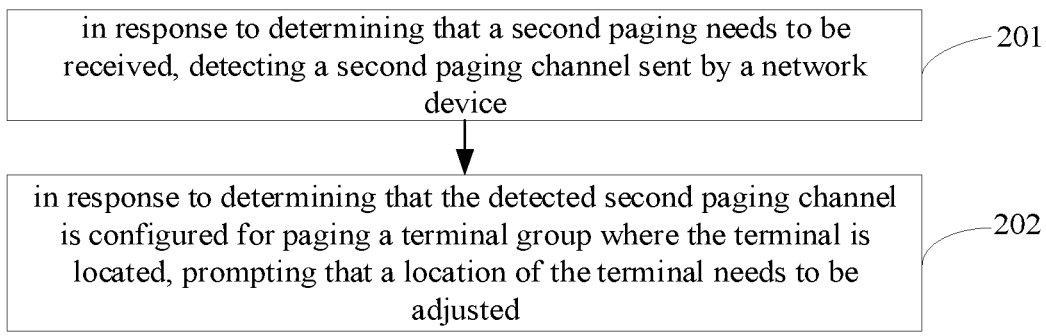
FIG. 4 is a schematic flowchart of another paging method according to an embodiment.

Referring to FIG. 4, it is a flowchart of a paging method according to an embodiment. The method may be used in a terminal. The method may include the following steps at 201-202.

At 201, in response to determining that a second paging needs to be received, a second paging channel sent by a network device is detected.

In the embodiment of the disclosure, the terminal may measure the signal quality, determine that the second paging needs to be received based on the currently measured signal quality, then may detect the second paging channel sent by the network device. The second paging is configured for the paging corresponding to the signal quality being less than or equal to the target signal threshold.

If the terminal determines that the first paging needs to be received based on the currently measured signal quality. The first paging is configured for the paging corresponding to the signal quality being greater than the target signal threshold. Then, the terminal directly follows the normal paging process to detect the first paging channel, and there is no need to detect the second paging channel.

At 202, in response to determining that the detected second paging channel is configured for paging a terminal group where the terminal is located, it is prompted that a location of the terminal needs to be adjusted.

In the embodiment of the disclosure, the user may adjust the location of the terminal based on a prompt displayed on the terminal that the location of the terminal needs to be adjusted, so that the first paging channel may be received normally.

In the above embodiment, the user may be enabled to adjust the location of the terminal by prompting that the location of the terminal needs to be adjusted, in the areas where the signal coverage of the network device is poor, so that the first paging channel may be normally received in the future, thus achieving the purpose of paging in the areas where the signal coverage of the network device is poor.

Figure 5:
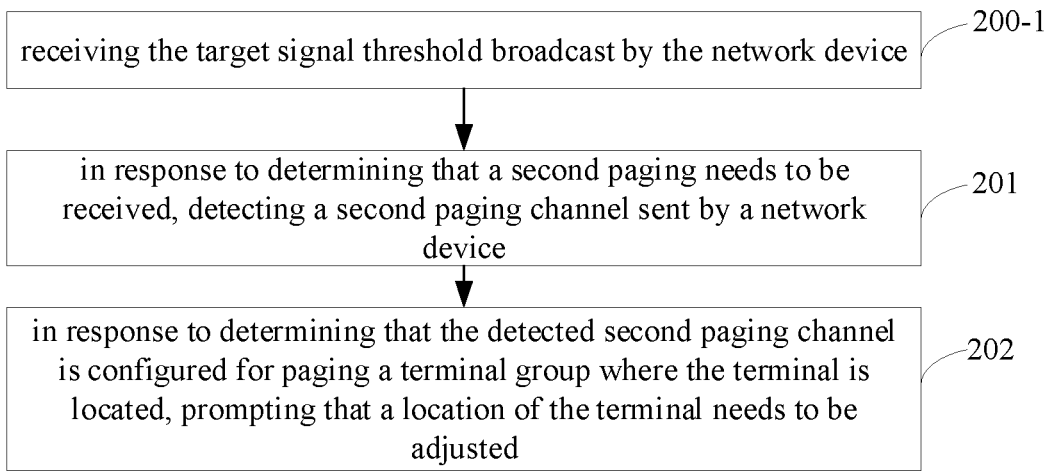
FIG. 5 is a schematic flowchart of another paging method according to an embodiment.

In an embodiment, referring to FIG. 5, it is a flowchart of another paging method according to the embodiment shown in FIG. 4. The above method further includes the step at 200-1.

At 200-1, the target signal threshold broadcast by the network device is received.

Correspondingly, in response to determining that the second paging needs to be received at 201 may include:

in response to a currently measured signal quality being less than or equal to the target signal threshold, determining that the second paging needs to be received.

In the embodiment of the disclosure, after determining the target signal threshold, the network device broadcasts the target signal threshold. The terminal determines which paging needs to be received based on the currently measured signal quality and the received target signal threshold. If the currently measured signal quality is less than or equal to the target signal threshold, it is determined that the second paging needs to be received; if the currently measured signal quality is greater than the target signal threshold, the first paging needs to be received.

The signal quality is a value of a measured signal quality parameter of a cell, and the signal quality parameter includes but not limited to reference signal receiving power (RSRP), reference signal receiving quality (RSRQ) and the like.

In the above embodiment, the terminal may determine whether the second paging needs to be received based on the received target signal threshold broadcast by the network device in combination with the currently measured signal quality, in order to detect the second paging channel later. The availability is high.

Figure 6:
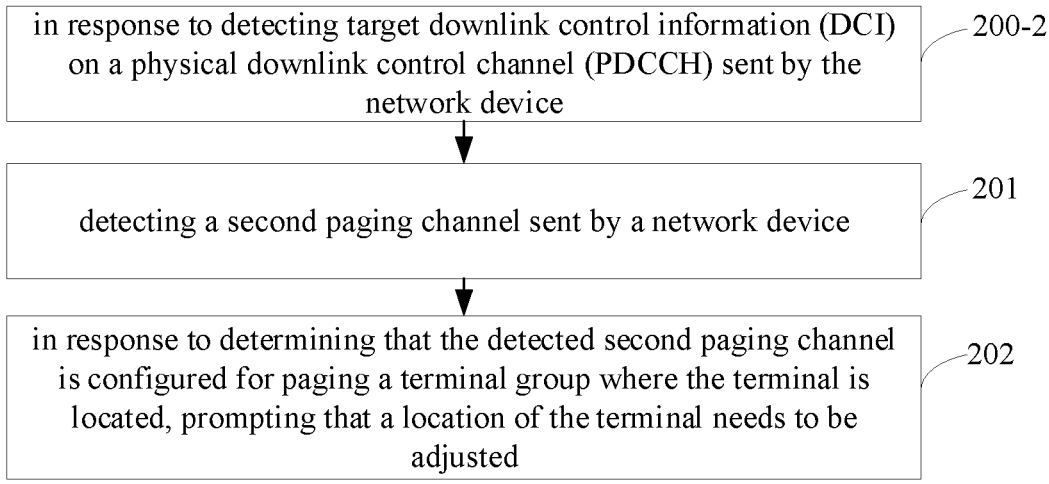
FIG. 6 is a schematic flowchart of another paging method according to an embodiment.

In an embodiment, referring to FIG. 6, it is a flow chart of another paging method according to the embodiment shown in FIG. 4. The above method further includes the step at 200-2.

At 200-2, in response to detecting target DCI on a PDCCH sent by the network device.

In the embodiment of the disclosure, the target DCI is the DCI with the CRC scrambled by the target RNTI, and the target RNTI is the RNTI corresponding to the second paging.

In an example, the target DCI is the DCI scrambled by the target RNTI, and the target RNTI is the deep paging RNTI set for the second paging, such as Deep-P-RNTI.

If the terminal detects the target DCI on the PDCCH, the terminal determines that there is a second paging, and may perform the step at 201 of detecting the second paging channel sent by the network device.

Figure 7:
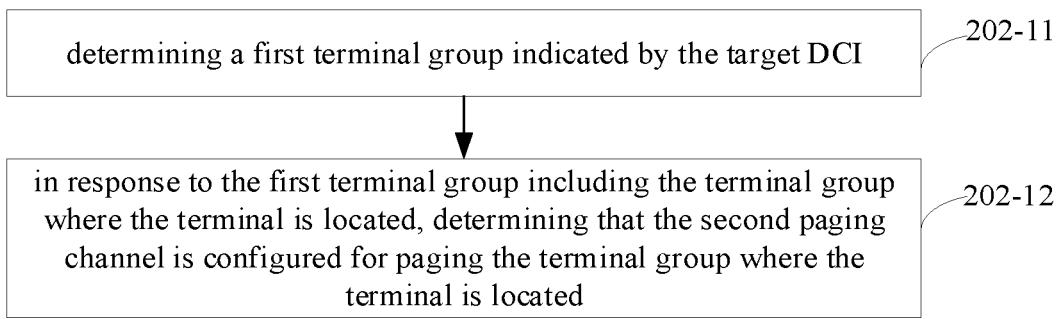
FIG. 7 is a schematic flowchart of another paging method according to an embodiment.

Correspondingly, referring to FIG. 7, it is a flowchart of another paging method according to the embodiment shown in FIG. 6, the step at 202 may include the steps at 202-11 and 202-12.

At 202-11, a first terminal group indicated by the target DCI is determined.

In the embodiment of the disclosure, the terminal may determine the first terminal group indicated by the target DCI based on the received target DCI.

At 202-12, in response to the first terminal group including the terminal group where the terminal is located, it is determined that the second paging channel is configured for paging the terminal group where the terminal is located.

In the above embodiment, the terminal may determine that there is a second paging based on the target DCI sent by the network device, so as to detect the second paging channel. In addition, it may be also determined the current paging first terminal group based on the indication of the target DCI. The implementation is simple and the availability is high.

Figure 8:
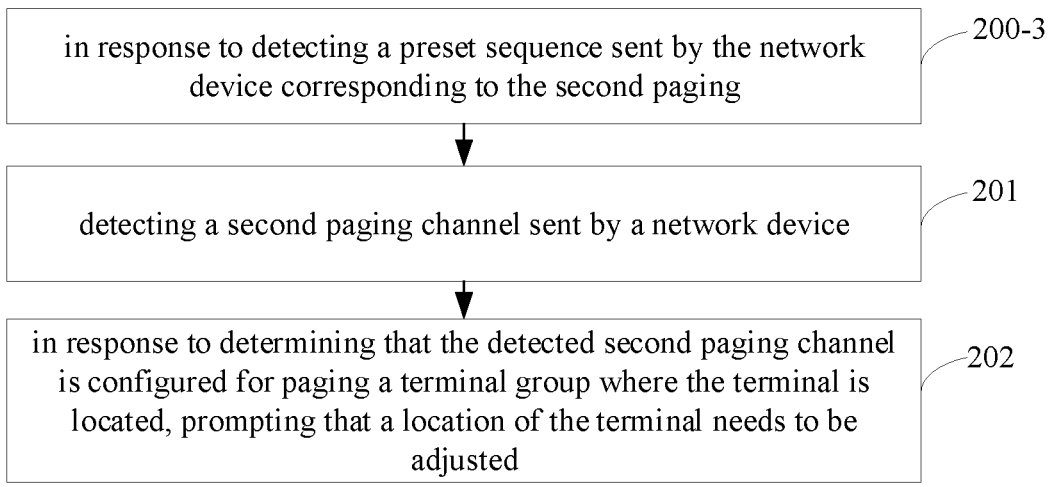
FIG. 8 is a schematic flowchart of another paging method according to an embodiment.

In an embodiment, referring to FIG. 8, it is a flowchart of another paging method according to the embodiment shown in FIG. 4. The above method further includes the step at 200-3.

At 200-3, in response to detecting a preset sequence sent by the network device and corresponding to the second paging.

In the embodiment of the disclosure, if the terminal receives the preset sequence corresponding to the second paging sent by the network device, it may be also determined that there is a second paging, and the step at 201 of detecting the second paging channel sent by the network device is performed.

The preset sequence may be a ZC sequence.

Figure 9:
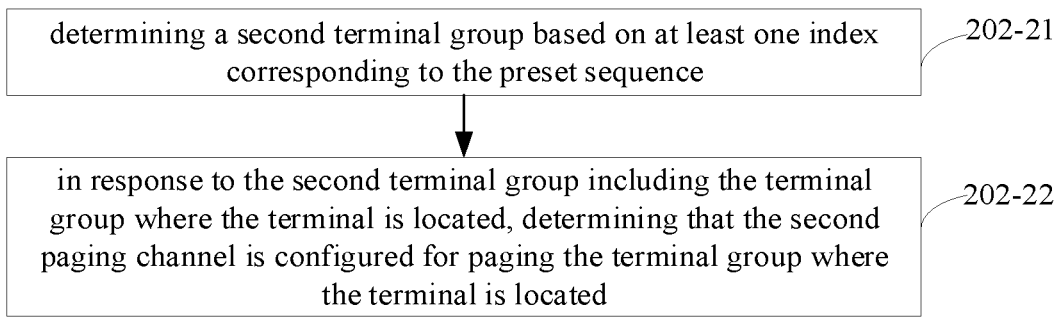
FIG. 9 is a schematic flowchart of another paging method according to an embodiment.

Correspondingly, referring to FIG. 9, it is a flowchart of another paging method according to the embodiment shown in FIG. 8, the step at 202 may include the following steps at 202-21 and 202-22.

At 202-21, a second terminal group is determined based on at least one index corresponding to the preset sequence.

In the embodiment of the disclosure, the preset sequence may be the ZC sequence, and at least one corresponding index may include a root index and/or a cycle index. The root index is a basic index of the ZC sequence, which corresponds to an original ZC sequence, and the cycle index is an index corresponding to a sequence obtained by the cyclic shift of the original ZC sequence.

The terminal side may determine the second terminal group corresponding to the at least one index of the preset sequence based on a preset-determined correspondence between different indexes and terminal groups.

At 202-22, in response to the second terminal group including the terminal group where the terminal is located, it is determined that the second paging channel is configured for paging the terminal group where the terminal is located.

In the embodiment of the disclosure, when the second terminal group includes the terminal group where the terminal is located, it may be determined that the second paging channel is configured for paging the terminal group where the terminal is located.

In the above embodiment, the terminal may determine that there is a second paging based on the preset sequence sent by the network device, so as to detect the second paging channel. In addition, it may be also determined the paging second terminal group based on the at least one index corresponding to the preset sequence. The implementation is simple and the availability is high.

Figure 10:
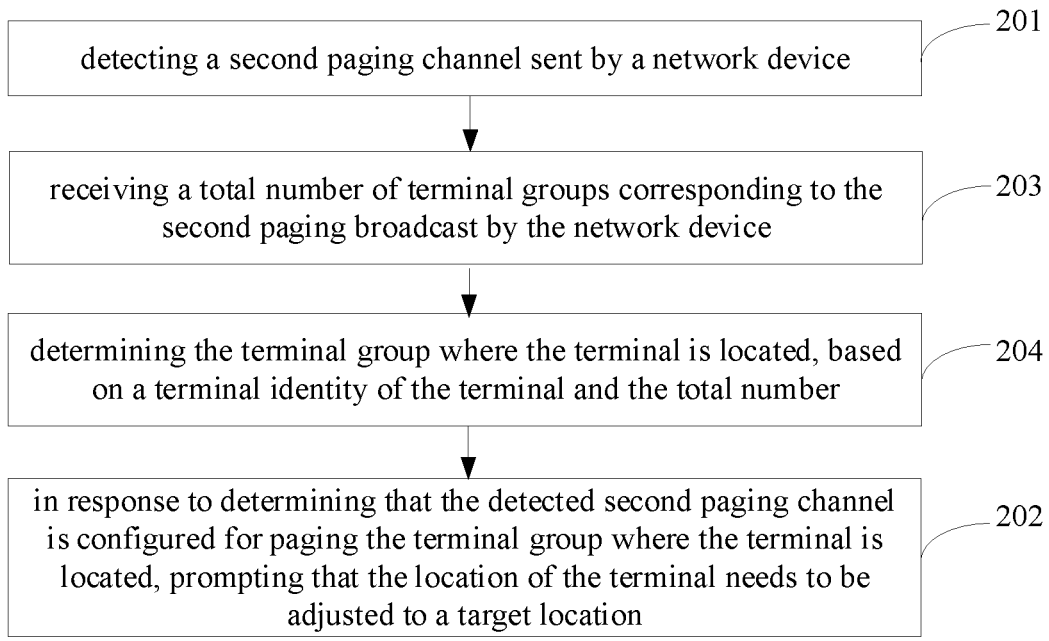
FIG. 10 is a schematic flowchart of another paging method according to an embodiment.

In an embodiment, referring to FIG. 10, it is a flowchart of another paging method according to the embodiment shown in FIG. 4. The above method further includes the following steps at 203-204.

At 203, a total number of terminal groups corresponding to the second paging broadcast by the network device is received.

At 204, the terminal group where the terminal is located is determined based on a terminal identity of the terminal and the total number.

In the embodiment of the disclosure, assuming that the total number of terminal groups corresponding to the second paging is M, then the terminal group n where the terminal is located may be determined by a way of taking a modulo of the terminal identity L by M, and the formula is expressed as follows: n=L mod M.

In the above embodiment, the terminal group where the terminal is located may be determined based on the total number of terminal groups corresponding to the second paging broadcast by the network device and the terminal identity of the terminal, so that it may be determined whether the received second paging pages the terminal group where the terminal is located.

In an embodiment, the step at 202 includes:

prompting that the location of the terminal needs to be adjusted to a target location.

In the embodiment of the disclosure, the target location is a location with good signal quality, including but not limited to a window, an outdoor, an open area and other locations.

In an example, a text prompt content "the network may be paging you, please adjust your location" may be displayed on the terminal.

In another example, a preset prompt content such as animations, videos, and emoticons corresponding to adjusting the location of the terminal may be displayed on the terminal.

In the above embodiment, the user may be enabled to adjust the location of the terminal by prompting that the location of the terminal needs to be adjusted, in the areas where the signal coverage of the network device is poor, so that the first paging channel may be normally received in the future, thus achieving the purpose of paging in the areas where the signal coverage of the network device is poor.

In an embodiment, after the terminal prompts that the location of the terminal needs to be adjusted, the terminal may be allowed to detect the first paging channel sent by the network device, so that the terminal may perform normal paging.

In an example, the terminal may start to detect the first paging channel sent by the network device after the terminal prompts that the location of the terminal needs to be adjusted for a preset number of times.

In another example, timing may also be performed when the terminal prompts as described above, and when the timing reaches a preset duration, the terminal starts to detect the first paging channel sent by the network device.

In another example, the terminal may also prompt that the location of the terminal needs to be adjusted for the preset number of times, start timing when the terminal prompts for the last time, and starts to detect the first paging channel sent by the network device when the timing reaches the preset duration.

Figure 11:
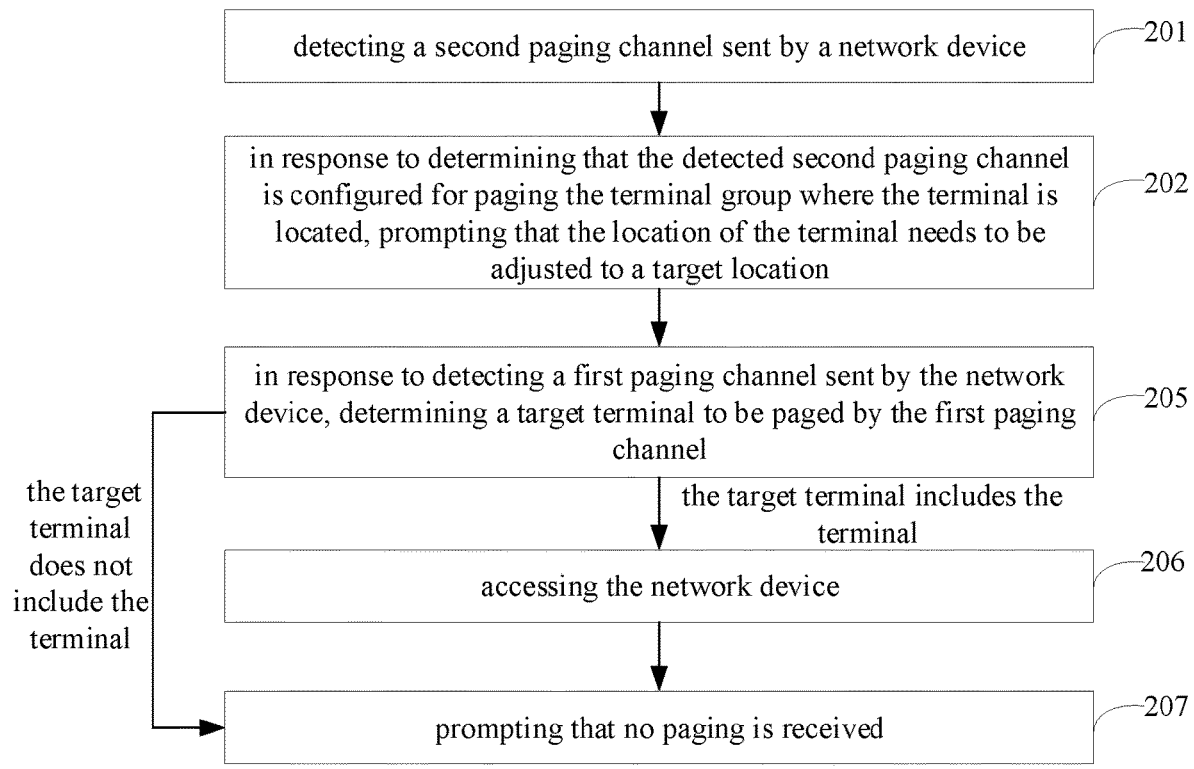
FIG. 11 is a schematic flowchart of another paging method according to an embodiment.

Referring to FIG. 11, it is a flowchart of another paging method according to the embodiment shown in FIG. 4. The above method further includes the following steps at 205-207.

At 205, in response to detecting a first paging channel sent by the network device, determine a target terminal to be paged by the first paging channel.

In the embodiment of the disclosure, after the above prompt for adjusting the location of the terminal, the user may have adjusted the location of the terminal, and the terminal may start to detect the first paging channel sent by the network device when the measured signal quality is higher than the target signal threshold. After the first paging channel is detected, the paging target terminal corresponding to a paging message included in the first paging channel is determined. If the target terminal includes the terminal, the step at 206 is executed. If the target terminal does not include the terminal, the step at 207 is executed.

At 206, the network device is accessed.

In the embodiment of the disclosure, the terminal determines that the target terminal includes the terminal itself, then enters the access process, accesses the network device, and completes normal paging.

At 207, it is prompted no paging is received.

In the embodiment of the disclosure, the terminal determines that the target terminal does not include the terminal itself, and may perform the prompt that no paging is received in order to prevent the user from continuing to wait.

In an example, the terminal may display a text prompt content "Sorry, no your paging information".

In another example, the preset prompt content corresponding to no paging is received such as animations, videos, emoticons and the like may be displayed on the terminal.

In the above embodiment, the terminal may determine the target terminal to be paged by the first paging channel when the first paging channel sent by the network device is detected after prompting that the location of the terminal needs to be adjusted. If the target terminal includes the terminal itself, the terminal may access the network device. If the target terminal does not include the terminal itself, it prompts that no paging is received. In the areas where the signal coverage of the network device is poor, the user may be enabled to adjust the location of the terminal by prompting that the location of the terminal needs to be adjusted, so that the first paging channel may be received normally, thus achieving the purpose of paging in the areas where the signal coverage of the network device is poor.

Figure 12:
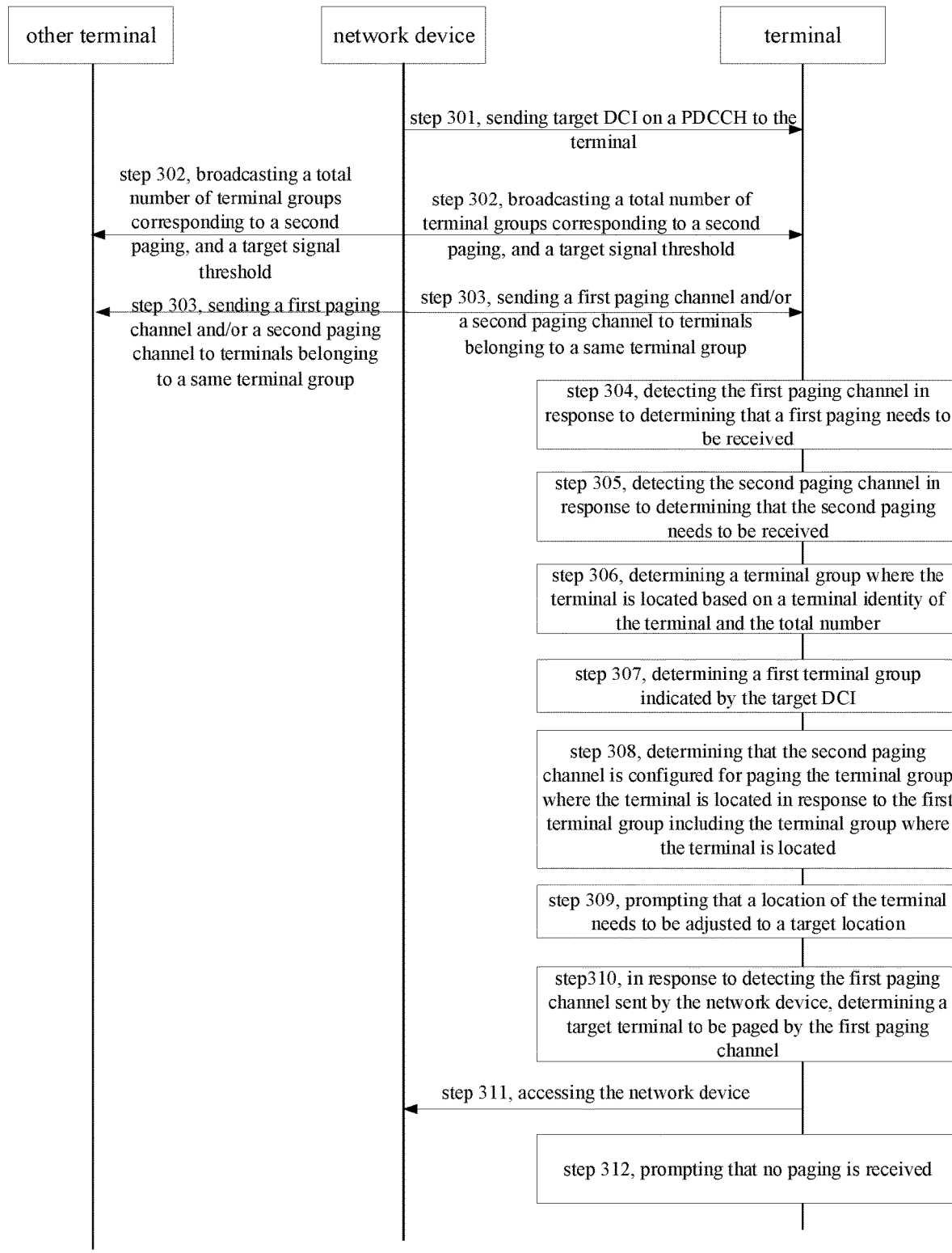
FIG. 12 is a schematic flowchart of another paging method according to an embodiment.

In an embodiment, referring to FIG. 12, it is a flowchart of a paging method according to an embodiment, and the method may include the following steps at 301-312.

At 301, the network device sends target DCI on the PDCCH to the terminal.

In the embodiment of the disclosure, the target DCI is the DCI scrambled by the target RNTI, and the target RNTI is the RNTI corresponding to the second paging.

The step at 301 may also be replaced with the step at 301' (not shown in FIG. 12): the network device sends a preset sequence to the terminal. The preset sequence may be a ZC sequence.

At 302, the network device broadcasts a total number of terminal groups corresponding to a second paging, and a target signal threshold.

At 303, the network device sends a first paging channel and/or a second paging channel to terminals belonging to a same terminal group.

At 304, the terminal detects the first paging channel in response to determining that a first paging needs to be received.

In the embodiment of the disclosure, when the signal quality currently measured by the terminal is greater than the target signal threshold, that is, the signal quality is good, the terminal determines that the first paging needs to be received. At this time, the normal paging process can be followed and the first paging channel is detected.

At 305, the terminal detects the second paging channel in response to determining that the second paging needs to be received.

In the embodiment of the disclosure, when the signal quality currently measured by the terminal is less than or equal to the target signal threshold, the terminal determines that the second paging needs to be received, and starts to detect the second paging channel at this time.

At 306, the terminal determines a terminal group where the terminal is located based on a terminal identity of the terminal and the total number.

At 307, the terminal determines a first terminal group indicated by the target DCI.

The step at 307 may also be replaced with the step at 305' (not shown in FIG. 12): determining a second terminal group based on at least one index corresponding to the preset sequence.

At 308, the terminal determines that the second paging channel is configured for paging the terminal group where the terminal is located in response to the first terminal group including the terminal group where the terminal is located.

In the embodiment of the disclosure, when the terminal determines the second terminal group at 307', the step at 308 may be replaced by the step at 308', including: in response to the second terminal group including the terminal group where the terminal is located, the terminal determines that the second paging channel is configured for paging the terminal group where the terminal is located.

At 309, the terminal prompts that a location of the terminal needs to be adjusted to a target location.

At 310, in response to detecting the first paging channel sent by the network device, the terminal determines a target terminal to be paged by the first paging channel.

If the target terminal includes the terminal, proceeding to step 311, otherwise proceeding to step 312.

At 311, the network device is accessed.

At 312, it is prompted that no paging is received.

In the above embodiment, when the terminal detects that it needs to receive the second paging, it may not detect the first paging channel until it detects the second paging channel and prompts that the location of the terminal needs to be adjusted. In the areas where the signal coverage of the network device is poor, the user may be enabled to adjust the location of the terminal by prompting that the location of the terminal needs to be adjusted, so that the first paging channel may be received normally in the future, thus achieving the purpose of paging in the areas where the signal coverage of the network device is poor.

Corresponding to the above embodiments of the method for implementing application functions, the disclosure also provides embodiments of apparatuses for implementing the application functions.

Figure 13:
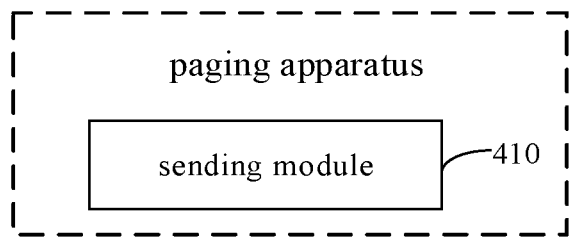
FIG. 13 is a block diagram of a paging device according to an embodiment.

Referring to FIG. 13, it is a block diagram of a paging apparatus according to an embodiment. The apparatus is used for a network device, and includes a sending module 410.

The sending module 410 is configured to send a first paging channel and/or a second paging channel to terminals belonging to a same terminal group, in which the first paging is configured for paging corresponding to a signal quality being greater than a target signal threshold, and the second paging is configured for paging corresponding to the signal quality being less than or equal to the target signal threshold.

Figure 14:
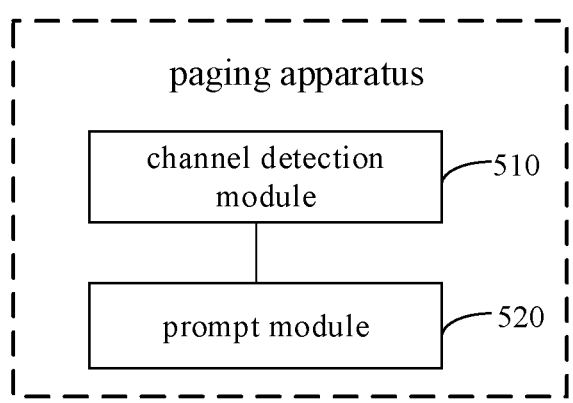
FIG. 14 is a block diagram of another paging device according to an embodiment.

Referring to FIG. 14, it is a block diagram of another paging apparatus according to an embodiment. The apparatus is used for a terminal and includes: a channel detection module 510 and a prompt module 520.

The channel detection module 510 is configured to detect a second paging channel sent by the network device in response to determining that a second paging needs to be received.

The prompt module 520 is configured to, in response to determining that the detected second paging channel is configured for paging a terminal group where the terminal is located, prompt that a location of the terminal needs to be adjusted.

As for the apparatus embodiment, since it basically corresponds to the method embodiment, the related parts may refer to the part description of the method embodiment. The apparatus embodiments described above are only exemplary, and the above-mentioned units described as separate components may or may not be physically separated, and the components shown as units may or may not be physical units, that is, they may be located in a place, or may also be distributed to multiple network elements. Part or all of the modules may be selected according to actual needs to achieve the purpose of the disclosed solution. It may be understood and implemented by those skilled in the art without creative efforts.

Correspondingly, the disclosure also provides a computer-readable storage medium having a computer program stored, and the computer program is configured to execute any one of the above paging methods on the network device side.

Correspondingly, the disclosure also provides a computer-readable storage medium having a computer program stored, and the computer program is configured to execute any one of the above paging methods on the terminal side.

Correspondingly, the disclosure also provides a paging device, including:
a processor;
a memory for storing instructions executable by the processor;

The processor is configured to execute any one of the above paging methods on the network device side.

Figure 15:
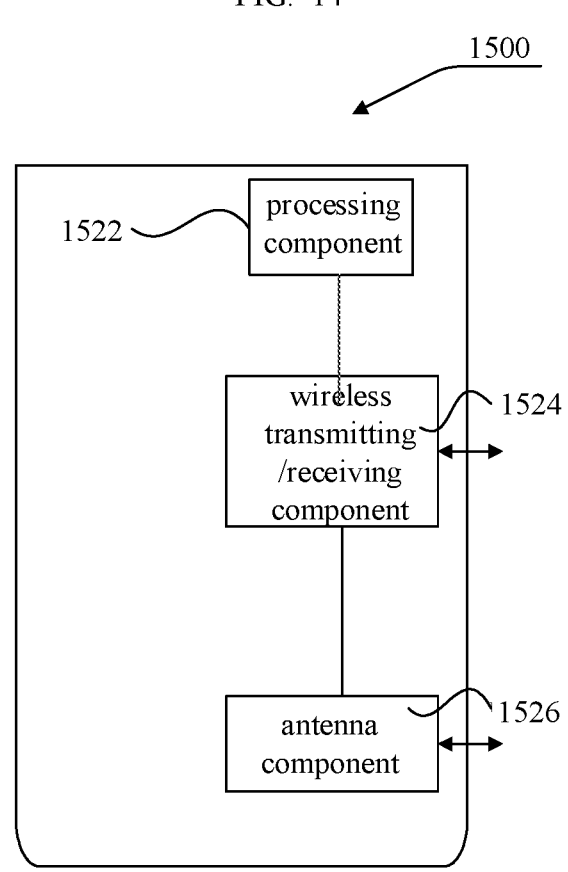
FIG. 15 is a structural schematic diagram of a paging device according to an embodiment of the disclosure.

As shown in FIG. 15, it is a structural schematic diagram of a paging device 1500 according to an embodiment. The device 1500 may be provided as a network device, including but not limited to a satellite and a base station. Referring to FIG. 15, the device 1500 includes a processing component 1522, a wireless transmitting/receiving component 1524, an antenna component 1526, and a signal processing part specific to a wireless interface. The processing component 1522 may further include one or more processors.

One of the processors in the processing component 1522 may be configured to execute any one of the paging methods described above on the network device side.

Correspondingly, the disclosure also provides a paging device, including:
a processor;
a memory for storing instructions executable by the processor;

The processor is configured to execute any one of the above paging methods on the terminal side.

Figure 16:
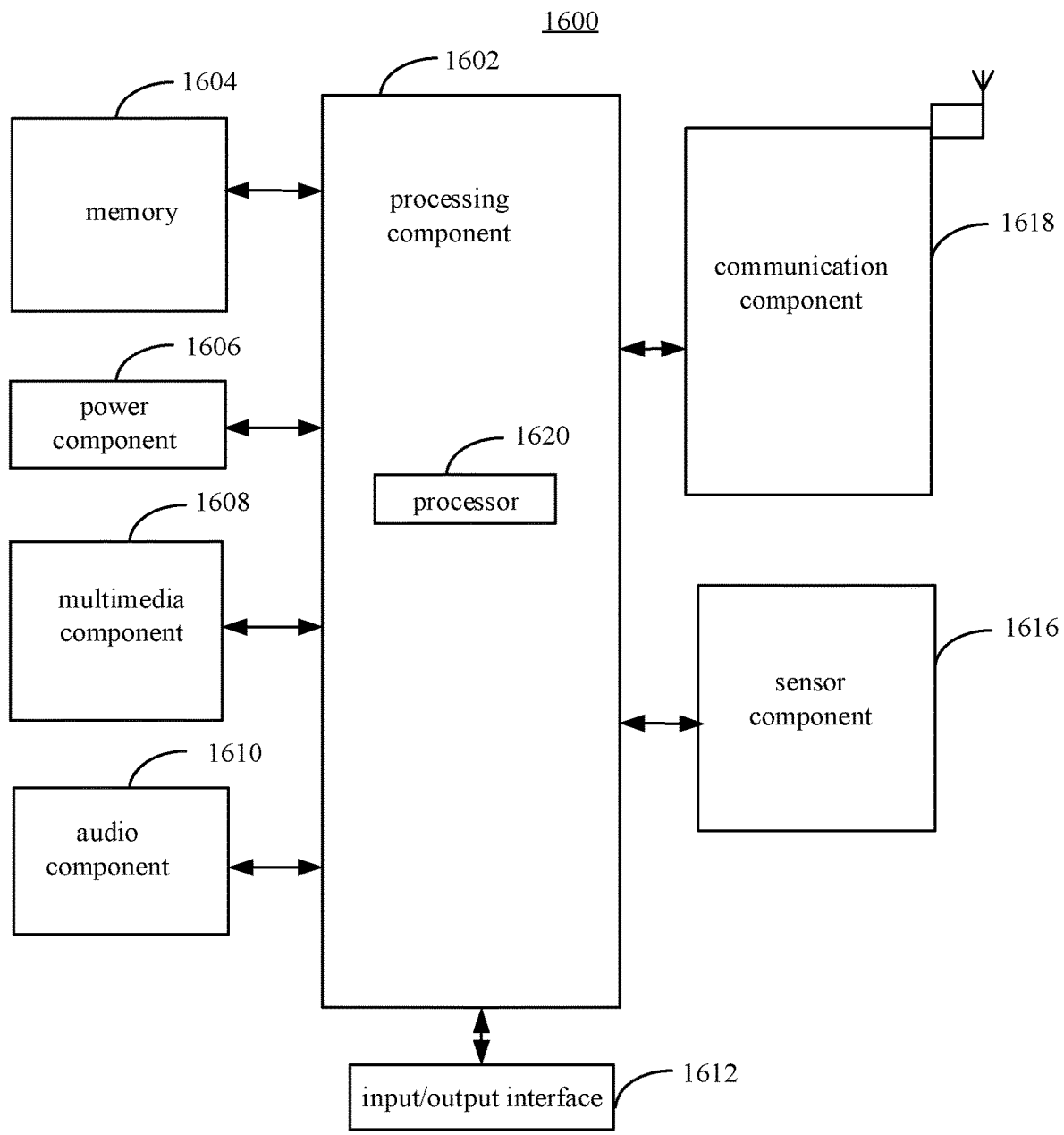
FIG. 16 is a structural schematic diagram of another paging device according to an embodiment of the disclosure.

FIG. 16 is a block diagram of an electronic device 1600 according to an embodiment. For example, the electronic device 1600 may be a network device.

Referring to FIG. 16, the electronic device 1600 may include one or more of the following components: a processing component 1602, a memory 1604, a power supply component 1606, a multimedia component 1608, an audio component 1610, an input/output (I/O) interface 1612, a sensor component 1616, and a communication component 1618.

The processing component 1602 generally controls overall operations of the electronic device 1600, such as those associated with display, telephone calls, data communications, camera operations, and recording operations. The processing component 1602 may include one or more processors 1620 to execute instructions, to complete all or part of the steps of the above paging method. Additionally, the processing component 1602 may include one or more modules that facilitate interactions between the processing component 1602 and other components. For example, the processing component 1602 may include a multimedia module to facilitate interactions between the multimedia component 1608 and the processing component 1602. For another example, the processing component 1602 may read executable instructions from the memory, so as to implement the steps of a paging method according to the above embodiments.

The memory 1604 is configured to store various types of data to support operations at the electronic device 1600. Examples of such data include instructions for any application program or method operating on the electronic device 1600, contact data, phonebook data, messages, pictures, videos, and the like. The memory 1604 may be realized by any type of volatile or non-volatile memory device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 1606 provides power to various components of the electronic device 1600. The power component 1606 may include a power management system, one or more power supplies, and other components associated with generating, managing, and distributing power for the electronic device 1600.

The multimedia component 1608 includes a display screen for providing an output interface between the electronic device 1600 and the user. In some embodiments, the multimedia component 1608 includes a front camera and/or a rear camera. When the electronic device 1600 is in an operation mode, such as a shooting mode or a video mode, the front camera and/or the rear camera may receive external multimedia data. Each of the front camera and the rear camera may be a fixed optical lens system or may have focal length and optical zoom capability.

The audio component 1610 is configured to output and/or input audio signals. For example, the audio component 1610 includes a microphone (MIC), which is configured to receive an external audio signal when the electronic device 1600 is in an operation mode, such as a call mode, a recording mode, and a voice recognition mode. The received audio signals may be further stored in the memory 1604 or sent via the communication component 1618. In some embodiments, the audio component 1610 also includes a speaker for outputting audio signals.

The I/O interface 1612 provides an interface between the processing component 1602 and a peripheral interface module. The peripheral interface module may be a keyboard, a click wheel, a button, and the like. These buttons may include, but are not limited to: a home button, volume buttons, a start button, and a lock button.

The sensor assembly 1616 includes one or more sensors for providing various aspects of state assessment for the electronic device 1600. For example, the sensor component 1616 may detect the open/closed state of the electronic device 1600, the relative positioning of components, such as the display and the keypad of the electronic device 1600. The sensor component 1616 may also detect changes in the position of the electronic device 1600 or one component of the electronic device 1600, a presence or absence of a contact between the user with electronic device 1600, an orientation or acceleration/deceleration of the electronic device 1600 and changes in the temperature of the electronic device 1600. The sensor component 1616 may include a proximity sensor configured to detect the presence of nearby objects in the absence of any physical contact. The sensor component 1616 may also include optical sensors, such as CMOS or CCD image sensors, for use in imaging applications. In some embodiments, the sensor component 1616 may also include an acceleration sensor, a gyroscope sensor, a magnetic sensor, a pressure sensor or a temperature sensor.

The communication component 1618 is configured to facilitate wired or wireless communication between the electronic device 1600 and other devices. The electronic device 1600 may access a wireless network based on communication standards, such as Wi-Fi, 2G, 3G, 4G, 5G, or 6G, or their combination. In an embodiment, the communication component 1618 receives a broadcast signal or broadcast related information from an external broadcast management system via a broadcast channel. In an embodiment, the communication component 1618 also includes a near field communication (NFC) module to facilitate short-range communication. For example, the NFC module may be implemented based on radio frequency identification (RFID) technology, infrared data association (IrDA) technology, ultra wide band (UWB) technology, bluetooth (BT) technology and other technologies.

In an embodiment, the electronic device 1600 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic component implementation for performing the paging method described above.

In an embodiment, there is also provided a non-transitory machine-readable storage medium including instructions, such as the memory 1604 including instructions, which can be executed by the processor 1620 of the electronic device 1600 to implement the above paging method. For example, the non-transitory computer readable storage medium may be the ROM, a random access memory (RAM), a CD-ROM, a magnetic tape, a floppy disk, an optical data storage device, and the like.

In the embodiment of the disclosure, the network device may send the first paging channel and/or the second paging channel to the terminals belonging to the same terminal group. The first paging is configured for paging corresponding to the signal quality being greater than the target signal threshold, and the second paging is configured for paging corresponding to the signal quality being less than or equal to the target signal threshold. When the terminal determines that a second paging needs to be received, the terminal detects the second paging channel sent by the network device; and when the terminal determines that the detected second paging channel is configured for paging the terminal group where the terminal is located, the terminal prompts that the location of the terminal needs to be adjusted. In the areas where the signal coverage of the network device is poor, the disclosure enables the user to adjust the location of the terminal by prompting that the location of the terminal needs to be adjusted, so that the first paging channel may be received normally in the future, thus achieving the purpose of paging in the areas where the signal coverage of the network device is poor.

In the embodiments of the disclosure, the network device may instruct the terminal to detect the second paging channel by sending the target DCI on the PDCCH, or the network device may instruct the terminal to detect the second paging channel by sending the preset sequence corresponding to the second paging channel. The availability is high.

In the embodiment of the disclosure, the network device may broadcast the total number of terminal groups corresponding to the second paging, and/or the target signal threshold. The terminal determines the terminal group to which it belongs, based on the total number of terminal groups corresponding to the second paging and its own terminal identity. In addition, the terminal may also determine whether to receive the second paging based on the target signal threshold and the currently measured signal quality. The implementation is simple and the availability is high.

In the embodiment of the disclosure, the terminal may determine that it needs to detect the second paging channel sent by the network device, based on the target DCI or the preset sequence sent by the network device. Further, the terminal may determine the first terminal group indicated by the target DCI, or determine the second terminal group based on at least one index corresponding to the preset sequence. In the case that the first terminal group or the second terminal group includes the terminal group where the terminal is located, it is determined that the second paging channel is configured for paging the terminal group where the terminal is located. The purpose of paging is achieved in the areas where the signal coverage of the network device is poor.

In the embodiment of the disclosure, after the terminal prompts that the location of the terminal needs to be adjusted, the terminal may detect the first paging channel sent by the network device, and determine whether the terminal is included in the target terminal to be paged by the first paging channel. If the target terminal includes the terminal, the terminal may access the network device, and if the target terminal does not include the terminal, it may prompt that no paging is received. The disclosure enables the user to adjust the location of the terminal by prompting the user to adjust the location of the terminal in the areas where the signal coverage of the network device is poor, so that the first paging channel may be normally received, and the purpose of paging in the areas where the signal coverage of the network device is poor is achieved.

Other embodiments of the disclosure may be easily envisaged by those skilled in the art from consideration of the specification and practice of the invention disclosed herein. The disclosure is intended to cover any modification, usage or adaptation of the disclosure, which follow the general principles of the disclosure and include common knowledge or conventional technical means in the technical field not disclosed in the disclosure. The specification and examples are to be considered exemplary only, with a true scope of the disclosure being indicated by the following claims.

It should be understood that the disclosure is not limited to the precise structures or specific steps that have been described above and shown in the accompanying drawings, and various modifications, changes and combinations may be made without departing from the scope thereof. The scope of the disclosure is limited only by the appended claims.

What is claimed is:

1. A paging method, comprising:
    sending, by a base station, at least one of a first paging message or a second paging message to wireless terminals belonging to a wireless terminal group, wherein the first paging message is configured by the base station for first paging corresponding to a signal quality being greater than a target signal threshold, and the second paging message is configured by the base station for second paging corresponding to the signal quality being less than or equal to the target signal threshold; and
    broadcasting, by the base station and to the wireless terminals, the target signal threshold and a total number of wireless terminal groups corresponding to the second paging;
    wherein when a wireless terminal in the wireless terminal group determines the second paging message needs to be received base on a determination that a currently measured signal quality is less than or equal to the target signal threshold and detects the second paging message configured for paging the wireless terminal group where the wireless terminal is located, the wireless terminal prompts that a user of the wireless terminal adjusts a location of the wireless terminal to a target location, wherein a signal quality at the target location is greater than the target signal threshold; and
    wherein the wireless terminal determines the wireless terminal group where the wireless terminal is located by taking a modulo of a terminal identity of the wireless terminal by the total number of wireless terminal groups.

2. The method of claim 1, further comprising:
sending, by the base station, target downlink control information (DCI) on a physical downlink control channel (PDCCH), wherein the target DCI is DCI scrambled by a target radio network temporary identity (RNTI), and the target RNTI is RNTI corresponding to the second paging.

3. The method of claim 1, further comprising:
sending, by the base station, a preset sequence corresponding to the second paging.

4. A paging method, comprising:
receiving, by a wireless terminal, a target signal threshold broadcast by a base station;
based on a determination by the wireless terminal that a currently measured signal quality is less than or equal to the target signal threshold, determining, by the wireless terminal, that a second paging message sent by the base station needs to be received, and detecting, by the wireless terminal, the second paging message, wherein the second paging message is configured for second paging corresponding to a signal quality being less than or equal to the target signal threshold;
in response to determining that the second paging message detected is configured for paging a wireless terminal group where the wireless terminal is located, prompting, by the wireless terminal, a user of the wireless terminal to adjust a location of the wireless terminal to a target location, wherein a signal quality at the target location is greater than the target signal threshold;
receiving, by the wireless terminal, a total number of wireless terminal groups corresponding to the second paging broadcast by the base station; and
determining the wireless terminal group where the wireless terminal is located by taking a modulo of a terminal identity of the wireless terminal by the total number of wireless terminal groups.

5. The method of claim 4, further comprising:
in response to detecting target downlink control information (DCI) on a physical downlink control channel (PDCCH) sent by the base station, detecting, by the wireless terminal, the second paging message, wherein the target DCI is DCI with cyclic redundancy check (CRC) scrambled by a target radio network temporary identity (RNTI) and the target RNTI is RNTI corresponding to the second paging.

6. The method of claim 5, wherein determining that the second paging message detected is configured for paging the wireless terminal group where the wireless terminal is located, comprises:
determining a first wireless terminal group indicated by the target DCI; and
in response to determining that the first wireless terminal group includes the wireless terminal group where the wireless terminal is located, determining that the second paging message detected is configured for paging the wireless terminal group where the wireless terminal is located.

7. The method of claim 4, further comprising:
in response to detecting a preset sequence sent by the base station corresponding to the second paging, detecting, by the wireless terminal, the second paging message, wherein the preset sequence is a Zadoff-Chu sequence.

8. The method of claim 7, wherein in response to determining that the second paging message detected is configured for paging the wireless terminal group where the wireless terminal is located comprises:
determining a second wireless terminal group based on at least one index corresponding to the preset sequence, wherein the at least one index comprises at least one of a root index or a cycle index; and
in response to determining that the second wireless terminal group includes the wireless terminal group where the wireless terminal is located, determining that the second paging message detected is configured for paging the wireless terminal group where the wireless terminal is located.

9. The method of claim 4, further comprising:
in response to detecting a first paging message sent by the base station, determining, by the wireless terminal, a target wireless terminal to be paged by the first paging message;
in response to determining that the target wireless terminal includes the wireless terminal, accessing, by the wireless terminal, the base station;
in response to determining that the target wireless terminal does not include the wireless terminal, prompting, by the wireless terminal, that no paging is received.

10. A non-transitory computer readable storage medium having computer programs stored thereon, wherein the computer programs are configured to implement the paging method according to claim 1.

11. A non-transitory computer readable storage medium having computer programs stored thereon, wherein when the computer programs are configured to implement the paging method according to claim 4.

12. A paging device, comprising:
a processor; and
a memory for storing instructions executable by the processor;
wherein the processor is configured to execute the paging method according to claim 1.

13. A wireless terminal, comprising:
a processor; and
a memory for storing instructions executable by the processor;
wherein the processor is configured to:
receive a target signal threshold broadcast by a base station;
based on a determination by the wireless terminal that a currently measured signal quality is less than or equal to the target signal threshold, determine a second paging message sent by the base station needs to be received, and detect the second paging message, wherein the second paging message is configured for second paging corresponding to the signal quality being less than or equal to a target signal threshold;
in response to determining that the second paging message detected is configured for paging a wireless terminal group where the wireless terminal is located, prompt that a user of the wireless terminal adjusts a location of the wireless terminal to a target location, wherein a signal quality at the target location is greater than the target signal threshold;
receive a total number of wireless terminal groups corresponding to the second paging broadcast by the base station; and determine the wireless terminal group where the wireless terminal is located by taking a modulo of a terminal identity of the wireless terminal by the total number of wireless terminal groups.

14. The wireless terminal of claim 13, wherein the processor is further configured to:
- in response to detecting target downlink control information (DCI) on a physical downlink control channel (PDCCH) sent by the base station, detect the second paging message, wherein the target DCI is DCI with cyclic redundancy check (CRC) scrambled by a target radio network temporary identity (RNTI) and the target RNTI is RNTI corresponding to the second paging.

15. The wireless terminal of claim 13, wherein the processor is further configured to:
- in response to detecting a first paging message sent by the base station, determine a target wireless terminal to be paged by the first paging message;
- in response to determining that the target wireless terminal includes the wireless terminal, access the base station;
- in response to determining that the target wireless terminal does not include the wireless terminal, prompt that no paging is received.

* * * * *